United States Patent [19]
Viegas

[11] Patent Number: 5,252,874
[45] Date of Patent: Oct. 12, 1993

[54] ELECTROMAGNETIC CLUTCH WITH TORQUE ISOLATION FOR RETURN SPRINGS

[75] Inventor: Herman H. Viegas, Bloomington, Minn.

[73] Assignee: Thermo King Corporation, Minneapolis, Minn.

[21] Appl. No.: 980,415

[22] Filed: Nov. 20, 1992

[51] Int. Cl.[5] ............ H02K 49/00; F16D 19/00
[52] U.S. Cl. .................... 310/103; 310/100; 192/101; 192/106.2; 192/111 A
[58] Field of Search ............... 310/103, 108, 92, 100; 192/84 A, 89 R, 101, 106.2, 107 R, 107 C, 111 A, 111 R

[56] References Cited

U.S. PATENT DOCUMENTS

| | | | |
|---|---|---|---|
| 3,394,787 | 7/1968 | Fitzgerald | 192/84 A |
| 3,857,468 | 12/1974 | Ikitono et al. | 192/111 A |
| 4,187,939 | 2/1980 | Silvestrini et al. | 192/84 C |
| 4,243,128 | 1/1981 | Shirai | 192/84 C |
| 4,640,400 | 2/1987 | Nakane et al. | 192/111 A |
| 4,770,002 | 9/1988 | Viegas et al. | 62/239 |
| 4,808,870 | 2/1989 | Gonda | 310/78 |
| 4,846,327 | 7/1989 | Mayer | 192/84 C |
| 4,913,274 | 4/1990 | Nishimura | 192/84 T |
| 4,972,932 | 11/1990 | Nakamura et al. | 192/84 B |
| 4,993,532 | 2/1991 | Weiss et al. | 192/111 A |
| 5,009,297 | 4/1991 | Gonda | 192/84 C |
| 5,031,745 | 7/1991 | Nishimura | 192/84 T |
| 5,052,244 | 10/1991 | Kamiya et al. | 74/574 |

Primary Examiner—Steven L. Stephan
Assistant Examiner—Matthew Nguyen
Attorney, Agent, or Firm—M. J. Moran

[57] ABSTRACT

An electromagnetic clutch, including a contact plate assembly, a rotor adapted for connection to a driven device, and first mounting assembly for mounting the contact plate assembly to a rotatable member associated with a driving device. The first mounting assembly includes compression springs for biasing the contact plate assembly away from the rotor. An electromagnetic assembly overcomes the bias of the compression springs when energized, causing the contact plate assembly to engage the rotor. The first mounting assembly includes resiliently mounted members which allow the contact plate assembly to oscillate circumferentially relative to the rotatable member, in response to torsional oscillations in the driving device. A second mounting assembly mounts each of the compression springs between the rotatable member and the contact plate assembly, isolating the compression springs from damage due to relative circumferential movement between the rotatable member and contact plate assembly.

6 Claims, 3 Drawing Sheets

ELECTROMAGNETIC CLUTCH WITH TORQUE ISOLATION FOR RETURN SPRINGS

TECHNICAL FIELD

The invention relates in general to an electromagnetic clutch for selectively transmitting rotation between a rotatable input force and a rotatable output shaft, and more specifically to means for reducing torque oscillation induced damage to components of such an electromagnetic clutch.

BACKGROUND ART

In certain applications, including transport refrigeration applications, it is common to drive a component, such as a refrigerant compressor, from one of two available prime movers, i.e., an internal combustion engine, such as a diesel engine, and a stand-by electric motor. When the electric motor is operative, the engine is commonly disconnected via a centrifugal clutch. Engine operating speeds are being reduced to reduce noise levels, and a centrifugal clutch is not suitable at some of the selected low operating speeds. Thus, the use of electromagnetic clutches instead of centrifugal clutches is becoming more attractive. Tests using electromagnetic clutches, however, especially when the electromagnetic clutch is operated in line between an engine flywheel and a refrigerant compressor, disclosed damage to the clutch plate return mechanism due to torsional oscillations inherent in the operation of small diesel engines. For example, compression springs which return the armature plate to a disengaged position following de-energization of the electromagnetic clutch, were damaged, as well as the spring bolts and the clearance holes for the spring bolts in an armature-flywheel adapter plate.

It would be desirable, and it is an object of the invention, to provide an electromagnetic clutch construction which reduces damage to the clutch plate return mechanism due to torsional oscillation in the driving force applied to the clutch from a driving source.

SUMMARY OF THE INVENTION

Briefly, the invention includes an electromagnetic clutch having first rotatable means adapted for connection to driven means, contact plate means, and first mounting means for mounting the contact plate means to second rotatable means associated with an external driving source. The first mounting means includes a plurality of compression springs for biasing the contact plate means in a direction away from the first rotatable means. Electromagnetic means is provided for overcoming the bias of the compression springs when energized, causing the contact plate means to engage the first rotatable means.

The first mounting means includes resilient means which allow the contact plate means to oscillate circumferentially relative to the second rotatable means, in response to torsional oscillations in the external driving source. Second mounting means is provided which mounts each of the compression springs between the second rotatable means and the contact plate means, with the second mounting means isolating the compression springs from damaging effects of circumferential oscillation of the contact plate means relative to the second rotatable means, in effect providing torque isolation for the return springs.

In a preferred embodiment of the invention, the resilient means of the first mounting means includes a dowel pin and a resilient bushing, each fixed to a selected one of the second rotatable means and contact plate means, with the resilient bushing being oriented to allow axial movement between the dowel pin and resilient bushing in a direction substantially parallel to a rotational axis of the second rotatable means during energization and de-energization of the electromagnetic means. The resilient bushing further allows relative movement between the dowel pin and resilient bushing in a direction perpendicular to the rotational axis of the second rotatable means.

In the preferred embodiment each of the compression springs includes first and second axial ends, with the second mounting means for each compression spring including a first spring seat disposed in the contact plate means for receiving the first axial end of a compression spring. The second mounting means further includes a spring retaining clip fixed to the second rotatable member, with the clip being spaced from the first spring seat to retain a compression spring in the first spring seat. Spacer means, which functions as a second spring seat, is disposed between the second axial end of a compression spring and an associated spring retaining clip, with the spacer means being selected to provide a coefficient of sliding friction which enables the compression spring and associated spacer means to slide against the associated spring clip when the contact plate means oscillates circumferentially relative to the second rotatable means.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
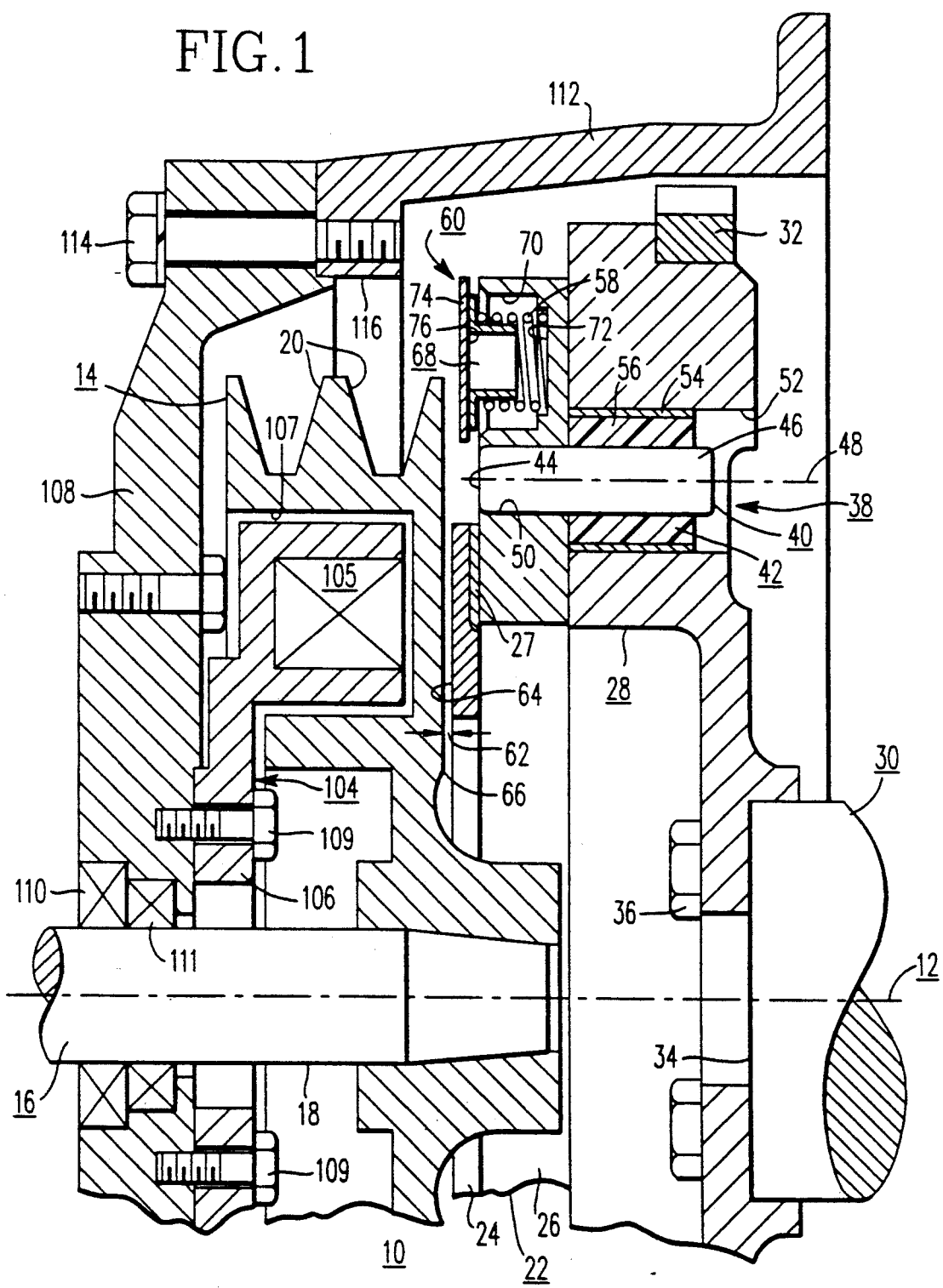
FIG. 1 is a cross sectional view of an electromagnetic clutch which illustrates the principles of the invention.

Referring now to the drawings, and to FIG. 1 in particular, there is shown an electromagnetic clutch 10 constructed according to the teachings of the invention. Electromagnetic clutch 10 is symmetrical about a central axis 12, and thus only that portion of electromagnetic clutch 10 on the upper side of axis 12 is shown in full. Electromagnetic clutch 10 includes a ferromagnetic rotatable member or rotor 14 which is adapted for connection to a driven device 16, such as a refrigerant compressor. As illustrated in FIG. 1, rotor 14 is fixed, such as with a key (not shown), to an input shaft 18 of driven device 16. Input shaft 16 has a longitudinal rotational axis which coincides with axis 12. Rotor 14 has a grooved outer periphery 20 which enables rotor 14 and driven device 16 to be driven by a first prime mover, such as an electric motor. Electromagnetic clutch 10 enables rotor 14 and driven device 16 to be driven by a second prime mover, such as an internal combustion engine.

Electromagnetic clutch 10 includes a contact plate assembly 22 which includes a ferromagnetic contact plate or armature 24, an adapter plate 26, and a non-magnetic spacer member 27. Spacer member 27, such as a 0.04 inch (1 mm) thick washer-like member formed of aluminum or brass, for example, is disposed between armature 24 and adapter plate 26 to reduce magnetic flux leakage. Adapter plate 26 adapts the contact plate assembly 22 for mounting relative to a rotatable member 28 associated with a driving device 30, i.e., the second prime mover. For example, driving device 30 may be an internal combustion engine, such as a diesel engine, and rotatable member 28 may be a flywheel having a ring gear 32 mounted thereon. Rotatable member 28 is suitably fixed to an output shaft 34 of driving device 30, such as by bolts 36. The rotational axis of output shaft 34 coincides with axis 12.

Contact plate assembly 22 is mounted to rotatable member 28 for axial movement relative thereto, i.e., movement parallel with axis 12, via first mounting means 38. First mounting means 38 includes a plurality of circumferentially spaced dowel pin-bushing combinations, with each such combination including a cylindrical dowel pin 40 and a bushing 42, each fixed to a selected one of the contact plate assembly 22 and rotatable member 28. Dowel pin 40, which has first and second axial ends 44 and 46, respectively, and a longitudinal axis 48, in a preferred embodiment of the invention, has its first end 44 fixed within an opening 50 defined by the adapter plate 26, and the bushing 42 is fixed within an opening 52 formed in rotatable member 28.

For purposes which will be further explained in detail, bushing 42 is a resilient bushing, i.e., at least a portion of bushing 42 is formed of a resilient, compressible material, such as rubber, polyurethane, and the like. As illustrated, bushing 42 may have an outer metallic tubular member 54 which surrounds an inner tubular member 56 formed of the aforesaid resilient material. The inner resilient tubular member 56 may have an inside diameter selected to slidably receive the outside diameter of dowel pin 40; or, resilient tubular member 54 may be sandwiched between and bonded to inner and outer metallic tubular members, in which case the inner tubular member will have an inside diameter selected to slidably receive the outside diameter of dowel pin 40.

Figure 3:
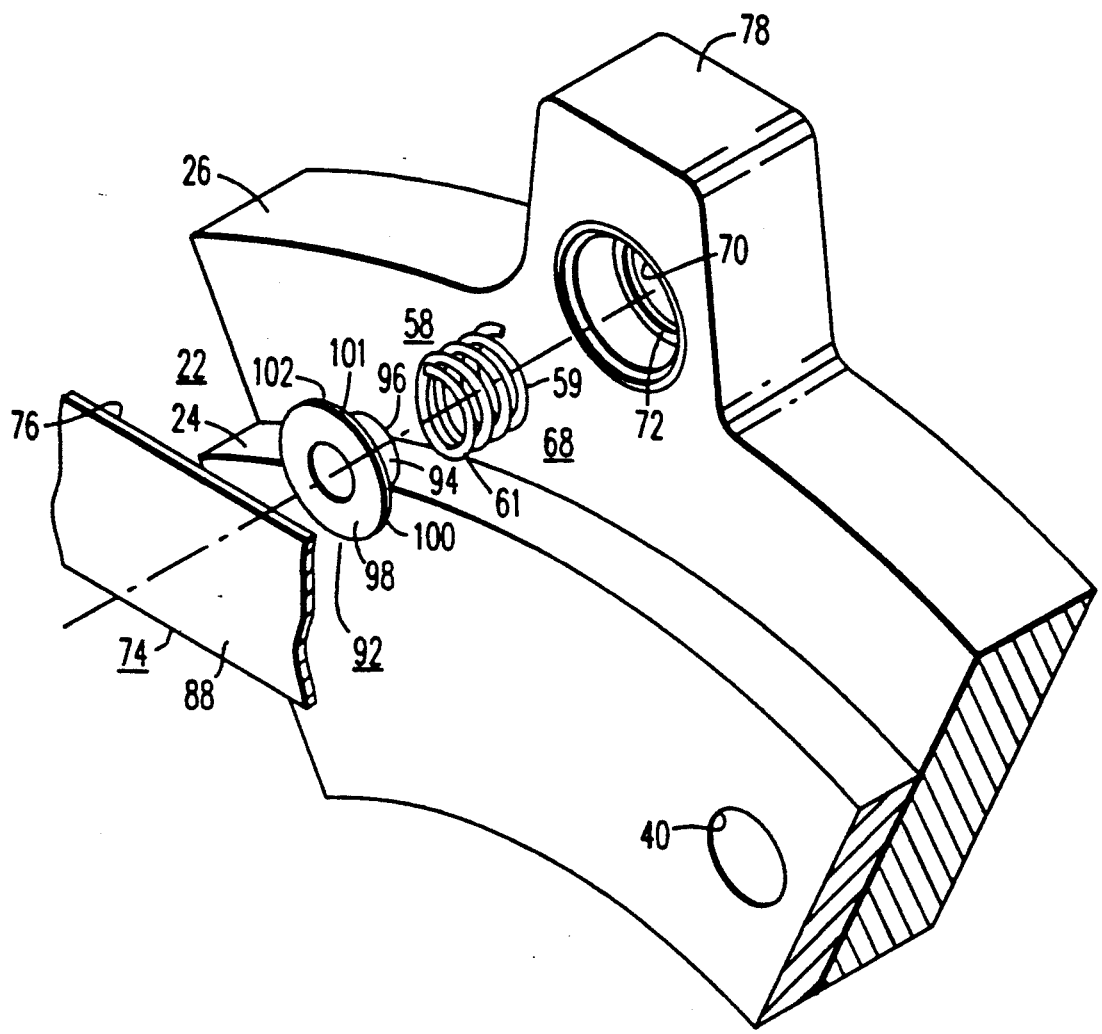
FIG. 3 is a fragmentary, exploded perspective view of the one of the return springs, spring bushing, and spring retainer clips shown in FIG. 2.

Contact plate assembly 22 is axially biased in a direction from left to right, when viewing FIG. 1, via a plurality of circumferentially spaced compression springs, such as compression spring 58. As best shown in FIG. 3, compression spring 58 has first and second axial ends 59 and 61, respectively. Compression springs 58 form part of a clutch plate return mechanism or means 60 which establishes a predetermined air gap 62, such as about 0.04–0.05 inch (1.0–1.25 mm), for example, between a flat major face 64 of armature 24 and a flat major face 66 of rotor 14, when electromagnetic clutch 10 is in a de-energized condition.

Each compression spring 58 is mounted between rotatable member 28 and contact plate assembly 22 via a second mounting means 68. The second mounting means 68 includes an inwardly extending opening 70 defined by adapter plate 26 which terminates in a first spring seat 72, and a spring retainer clip member 74 which is fixed to rotatable member 28. Spring clip member 74 has a flat surface 76 which faces, and is in spaced parallel relation with, spring seat 72.

Figure 2:
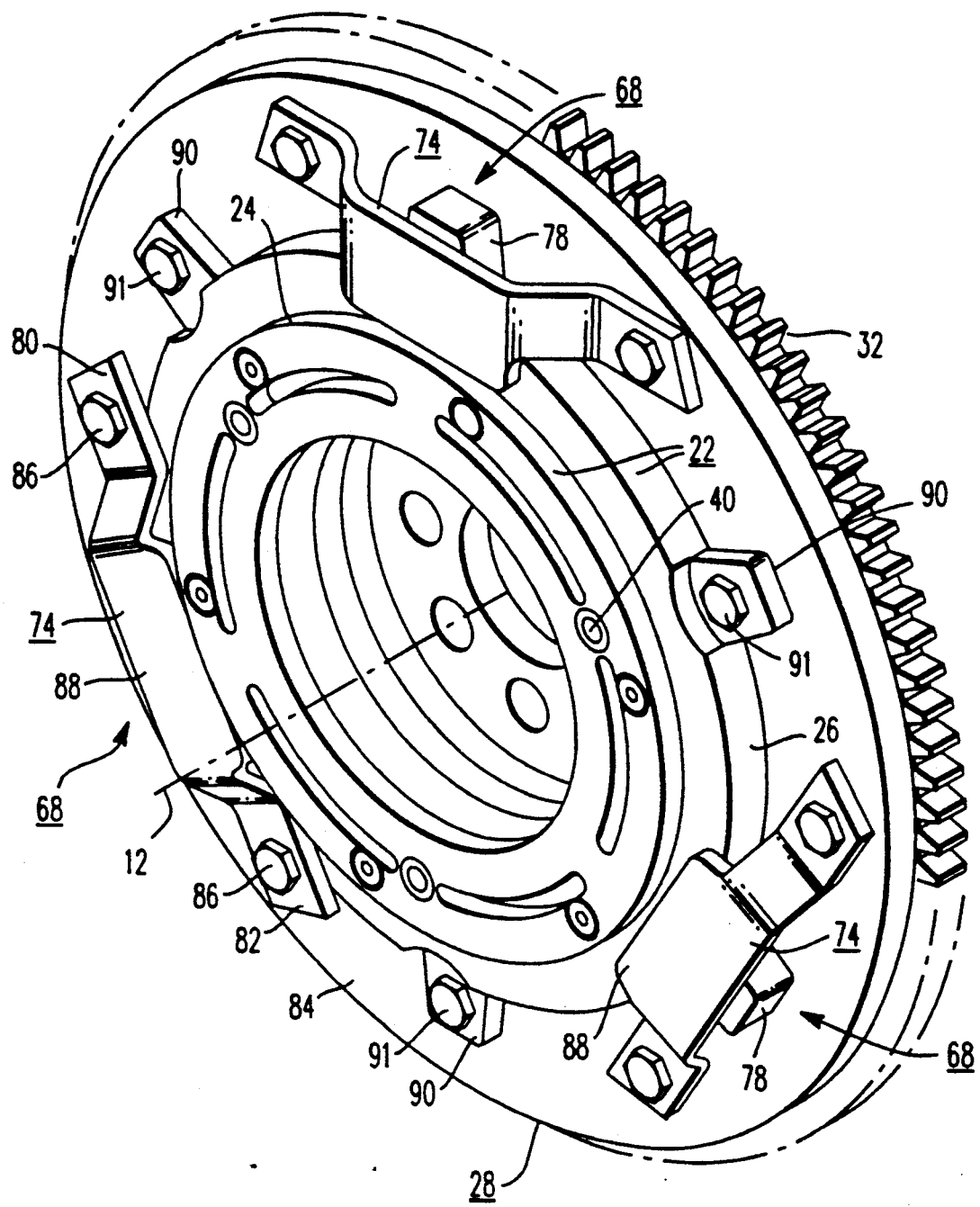
FIG. 2 is a perspective view of a practical embodiment of a portion of the electromagnetic clutch shown in FIG. 1, including a flywheel, a flywheel adapter plate, and clutch plate or armature, which more clearly illustrates spring retainer clips constructed according to the teachings of the invention.

As illustrated more clearly in FIG. 2, which illustrates a practical embodiment of the contact plate assembly 22 and the second mounting means 68, adapter plate 26 may have a plurality of outwardly extending ears 78, such as three, with each ear 78 defining one of the openings 70 and one of the spring seats 72. In the embodiment of FIG. 2, each spring clip member 74 includes first and second outwardly extending mounting leg portions 80 and 82 which are fixed to a flat face 84 of rotatable member 28, such as with screws 86, with the first and second mounting leg portions 80 and 82 being joined by an intermediate outwardly extending portion which includes a bight 88, the inner surface of which defines the hereinbefore mentioned 25 surface 76.

A plurality of additional circumferentially spaced ears 90 include bolt and lock nut combinations 91 for selecting the desired dimension of air gap 62 by moving contact plate assembly 22 relative to rotatable member 28.

Returning now to the construction of the second mounting means 68, instead of inner surface 76 of spring retainer clip 68 forming a second spring seat for a compression spring 58, as shown in FIG. 1, and even more clearly in FIG. 3, which is an exploded perspective view of the second mounting means 68, a second spring seat for compression spring 58 is formed by spacer means in the form of a metallic bushing member 92. Bushing member 92, for example, may have a first diameter defined by a cylindrical outer surface 94, with the first diameter starting at a first axial end 96 which is selected to enable surface 94 to slidably extend into an inside diameter defined by a compression spring 58. Adjacent to a second axial end 98 of bushing member 92 the first diameter defined by surface 94 steps sharply outward to a second larger diameter defined by a surface 100, forming a flange 101 having a spring seat defining surface 102 spaced from the second axial end 98 which defines a second spring seat for receiving the second axial end 61 of a compression spring 58.

The metallic materials of which spring retainer clip 68 and bushing member 92 are formed are selected to provide a low sliding coefficient of friction between them. For example, spring retainer clip 74 may be formed of electroless nickel plated steel, and bushing member 92 may be formed of bronze or an engineered plastic.

Electromagnetic means 104, i.e., an electromagnetic assembly 104 which includes an electrical coil 105 and a coil support member 106, is provided for creating a magnetic flux when energized which attracts armature plate 24 to rotor 14, closing air gap 62 to cause surfaces 64 and 66 to engage and cause rotation of input shaft 34 of driving device 30 to be imparted to rotation of rotor 14 and the driven device 16 represented by shaft 18. One, or both, of the surfaces 64 and 66 may be a high friction surface, to reduce chances of slippage between the engaged surfaces. Electromagnetic coil 105, which has electrical leads connected to associated electrical control, is disposed within an annular cavity 107 formed within rotor 14, with coil support member 106 being fixed to a plate member 108 via a plurality of bolts 109. In an application of clutch 10 in which driving device 30 is an internal combustion engine and driven device 16 is a refrigerant compressor, plate member 108 is a compressor seal plate. Shaft 18 is supported by compressor seal plate 108 via a bearing assembly 110. A shaft seal 111 seals shaft 18 against leakage of refrigerant and compressor oil. Compressor seal plate 108 is fixed to an engine fly-wheel housing 112 via a plurality of bolts 114. A surface 116 on fly-wheel housing 112 pilots compressor seal plate 108 to align the output shaft 34 of internal combustion engine 30 and input shaft 18 of compressor 16.

In the operation of electromagnetic clutch 10, when electromagnetic coil 104 is energized, attracting contact plate assembly 22 and causing armature surface 64 to engage rotor surface 66, the dowel pins 40 of the first mounting means 38 move axially by the small dimension defined by air gap 62, with bushing member 42 providing the axial guidance required. In addition to providing axial guidance, the resilient bushing members 42 additionally provide the function of absorbing torsional oscillations in the driving device 30, such as caused by a small diesel engine, with the resilient bushing members 42 permitting a small relative circumferential movement between rotatable member 28 and the contact plate assembly 22. In other words, the first mounting means 38 allows movement both parallel with, and perpendicular to, axis 12. The second mounting means 68 permits the clutch plate return spring mechanism 60 to also oscillate circumferentially in response to such torsional oscillations in the driving device 30, without damage to the compression springs 58. The surface 98 which defines the second axial end of bushing member 92 smoothly slides against the inner surface 76 of the spring retainer clip member 74, reducing the chance of mechanical damage to, and fatigue failure of, the clutch plate return mechanism 60. The first mounting means 38 also provides a larger tolerance in shaft misalignment between the driving and driven shafts 34 and 18 when the magnetic clutch 10 is assembled between the driving and driven devices 30 and 16.

I claim:

1. An electromagnetic clutch having first rotatable means adapted for connection to driven means; contact plate means; first mounting means for mounting said contact plate means to second rotatable means associated with an external driving source; the first mounting means including a plurality of compression springs for biasing the contact plate means away from the first rotatable means; and electromagnetic means for overcoming the bias of the compression springs when energized, for causing said contact plate means to engage said first rotatable means, the improvement comprising:

said first mounting means for mounting said contact plate means to said second rotatable means including resilient means which allow the contact plate means to oscillate circumferentially relative to the second rotatable means, in response to torsional oscillations in the external driving source, and second mounting means for mounting each of said compression springs between said second rotatable means and said contact plate means, with said second mounting means isolating said compression springs from damaging effects of circumferential oscillation of the contact plate means relative to the second rotatable means.

2. The electromagnetic clutch of claim 1 wherein the resilient means of the first mounting means includes a dowel pin and a resilient bushing, each fixed to a selected one of the second rotatable means and contact plate means, with said resilient bushing being oriented to allow axial movement between the dowel pin and resilient bushing in a direction substantially parallel to a rotational axis of the second rotatable means during energization and de-energization of the electromagnetic means, and with said resilient bushing allowing relative movement between the dowel pin and resilient bushing in a direction perpendicular to the rotational axis of the second rotatable means.

3. The electromagnetic clutch of claim 1 wherein the resilient means includes a dowel pin and a resilient bushing respectively fixed to the contact plate means and the second rotatable means, with said resilient bushing being oriented to allow axial movement of the dowel pin and contact plate means relative to the resilient bushing, in a direction parallel to a rotational axis of the second rotatable means, during energization and de-energization of the electromagnetic means, and with said resilient bushing allowing the dowel pin and contact plate means to move in a direction perpendicular to the rotational axis of the second rotatable means in response to torsional vibration in the second rotatable means.

4. The electromagnetic clutch of claim 1 wherein each of the compression springs includes first and second axial ends, and wherein the second mounting means for each compression spring includes a spring seat disposed in the contact plate means for receiving the first axial end of a compression spring, a spring retaining clip fixed to the second rotatable member which is spaced from said spring seat to retain a compression spring in the spring seat, and spacer means disposed between the second axial end of a compression spring and an associated spring retaining clip, said spacer means being selected to provide a coefficient of sliding friction which enables the compression spring and associated spacer means to slide against the associated spring clip when the contact plate means oscillates circumferentially relative to the second rotatable means.

5. The electromagnetic clutch of claim 4 wherein the spacer means is a metallic cylindrical member having first and second axial ends, an outer diameter selected to enable the first axial end to enter an axially extending opening defined by a compression spring, and a flange at the second axial end which is in slidable contact with a spring retainer clip while providing a spring seat for the second axial end of a compression spring.

6. The electromagnetic clutch of claim 1 wherein the contact plate means includes an armature plate, and an adapter plate for connecting the armature plate to the second rotatable means.

* * * * *